Figure 1:
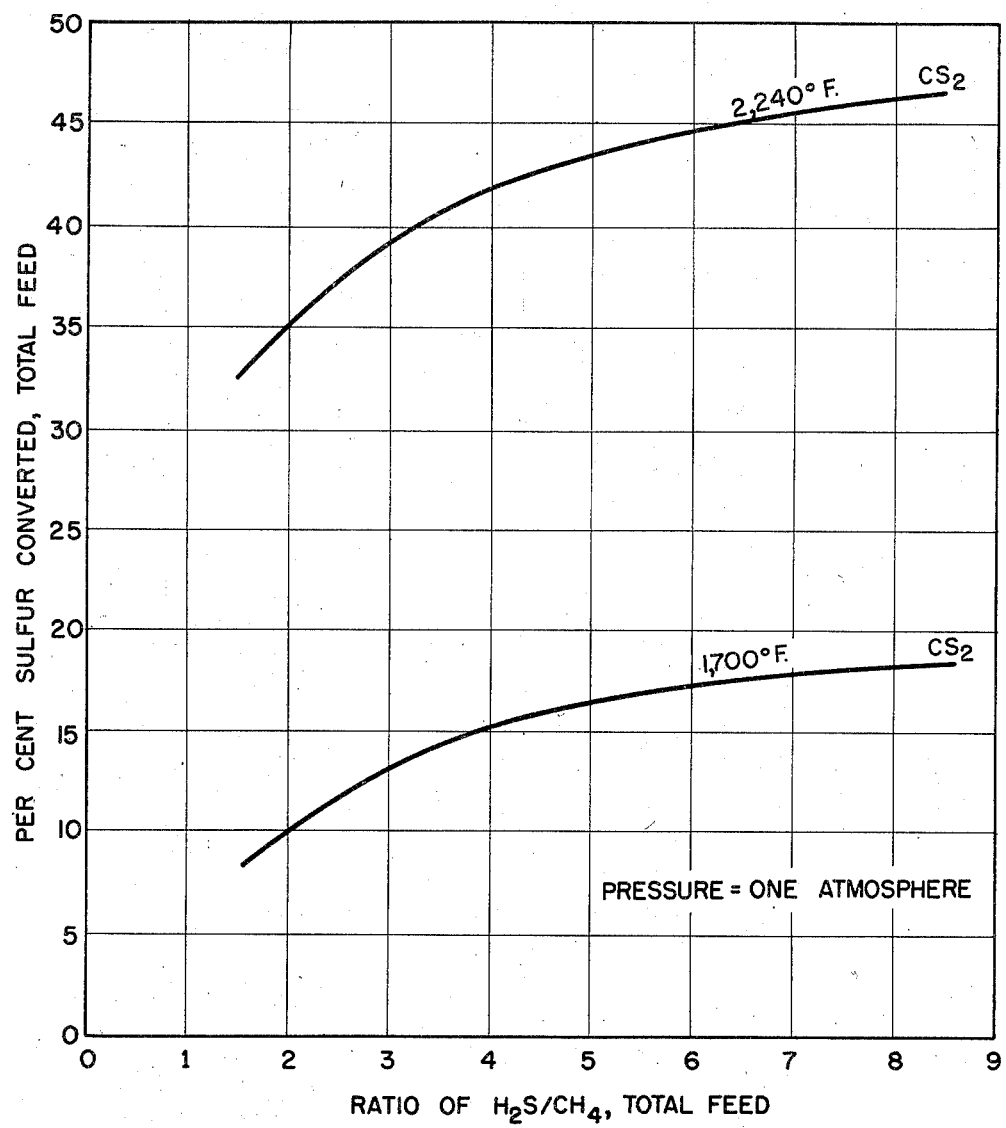

April 9, 1957     W. A. ADCOCK ET AL     2,788,262
PROCESS FOR PREPARATION OF CARBON DISULFIDE
Filed May 1, 1953     3 Sheets-Sheet 1

FIG. — 1

INVENTORS
WILLIS A. ADCOCK
WILLIAM C. LAKE
ATTORNEY

United States Patent Office 2,788,262
Patented Apr. 9, 1957

2,788,262
PROCESS FOR PREPARATION OF CARBON DISULFIDE

Willis A. Adcock and William C. Lake, Tulsa, Okla., assignors to Pan American Petroleum Corporation, Tulsa, Okla., a corporation of Delaware Application May 1, 1953, Serial No. 352,417

6 Claims. (Cl. 23—206)

Our invention relates to a novel process for the preparation of carbon disulfide. More particularly, it is concerned with a method for making carbon disulfide from hydrogen sulfide and hydrocarbons, particularly the lower molecular weight hydrocarbons, under novel conditions of temperatures and ratios of reactants.

It is an object of our invention to produce carbon disulfide in an economical and efficient manner from cheap and readily-available starting materials. It is another object of our invention to produce carbon disulfide by means by a reaction, certain of the byproducts of which may be employed as fuel to supply the necessary heat for the principal reaction. It is a still further object of our invention to provide a method which affords maximum conversion of the aforesaid starting materials to carbon disulfide.

In accordance with one embodiment of our invention, hydrogen sulfide and a suitable hydrocarbon such as, for example, a normally gaseous hydrocarbon are allowed to react with one another in the presence of suitable catalysts at temperatures ranging from about 1850° to about 2750° F. under conditions such that the mol ratio of hydrogen sulfide to hydrocarbon ranges from about 2:1 to about 8:1. With the above-defined conditions, the carbon-hydrogen atomic ratio in the reaction mixture should preferably be held within a range of from about 0.05 to about 0.125. By maintaining the carbon-hydrogen ratio within these limits under the aforesaid conditions of temperature and hydrogen sulfide-hydrocarbon ratios, the concentration of carbon is such that carbon deposition—though just on the verge of occurring—can be avoided. It is under such conditions of impending carbon deposition, at a given temperature, that we have found the highest conversions to carbon disulfide to occur. We have found operation of the reaction under conditions of imminent carbon deposition to be extremely important, and that any material variation from the carbon-hydrogen ratios recommended above results in a drastic decrease in the formation of carbon disulfide. Thus, if the carbon-hydrogen ratio decreases to a level below which carbon deposition is no longer impending, carbon disulfide yields drop off sharply. On the other hand, if the carbon-hydrogen ratio is increased to the point where carbon deposition occurs to an appreciable extent, the activity of the catalyst is reduced to the point where further operation is no longer economical. Likewise, overall efficiency of the reaction is decreased due to the formation of this undesirable product.

Owing to the fact that optimum conversions to carbon disulfide occur at the carbon deposition point, we have found that the molar ratio of hydrogen sulfide to hydrocarbon varies inversely with the temperature within the recited temperature range. Thus, at temperatures of the order of about 1850° F. the molar ratio of hydrogen sulfide to hydrocarbon required to obtain maximum conversion to carbon disulfide is about 8:1, while at temperatures of about 2750° F. the desired ratio is about 2:1.

Generally, however, we prefer to operate at temperatures ranging from about 2350° to about 2450° F. and to employ a hydrogen sulfide-hydrocarbon ratio in the neighborhood of about 4:1.

In carrying out the process of our invention it is presumed that the principal reaction occurring, for example, in the case of methane may be expressed in accordance with the following equation:

$$2H_2S + CH_4 \rightarrow CS_2 + 4H_2$$

However, from the foregoing discussion it will be observed that the particular molar ratio of hydrogen sulfide to hydrocarbon shown by the above equation is generally only considered adequate if temperatures of the order of 2700° F. are employed. Thus at temperatures of from about 2350° to about 2450° F. hydrogen sulfide is preferably employed in approximately fifty percent excess over the quantity theoretically required by the above equation, while at still lower temperatures—for example, at about 1800° F.—an excess of hydrogen sulfide of the order of about four hundred percent is indicated to be desirable. Expressed otherwise, the efficiency of the reaction may ordinarily be considered to decrease with temperatures ranging downwardly from about 2700° F. Thus the percent total feed conversion to carbon disulfide, based on sulfur, decreases from ninety-three percent at 2750° F. to sixty-five percent at 2400° F. and to twenty-seven percent at 1850° F. While maximum conversion to carbon disulfide is shown to be obtainable at temperatures in the neighborhood of 2700° F., for reasons of economy we prefer to operate at a temperature of about 2400° F. Although slightly higher amounts of carbon disulfide are formed per mol of fresh feed hydrogen sulfide or hydrocarbon with increasing temperature, this slight increase is not considered to be justified because of the increased heat requirements. While lower temperatures are desirable from the standpoint of heat economy, higher recycle ratios required at such temperatures necessitated by the lower total feed conversions greatly increase the size of the system and the investment costs. Thus, we prefer to operate at hydrogen sulfide-hydrocarbon ratios of about 4:1 since the total feed carbon disulfide conversion is relatively high under these conditions, while at the same time use of higher temperatures is avoided and only relatively low recycle ratios are required.

In connection with the foregoing discussion, it is to be understood that the temperature and molar ratio of hydrogen sulfide to hydrocarbon lying within the above-recited ranges assume that the carbon-hydrogen ratios prevailing at these conditions is such that the resulting system is always on the point of carbon deposition. For a given hydrogen sulfide-hydrocarbon ratio in the feed, the temperature maintained at the reaction zone should be such that the carbon-hydrogen ratio in said zone is substantially identical with that present in the feed. We have found that this condition is met if the temperature is decreased as the hydrogen sulfide-hydrocarbon ratio in the feed is increased. Thus, for example, in the case of methane and hydrogen sulfide the temperature may vary from about 2750° F. at a hydrogen sulfide-methane ratio of about 2:1 and at a carbon-hydrogen ratio of 0.125:1, to about 1850° F. at a hydrogen sulfide-methane ratio of 8:1 and at a carbon-hydrogen ratio of 0.05:1. Under our generally preferred conditions, including a carbon-hydrogen ratio of 0.075:1 and a hydrogen sulfide-hydrocarbon ratio of about 4:1, the desired temperature range is from about 2350° to about 2450° F.

Figure 2:
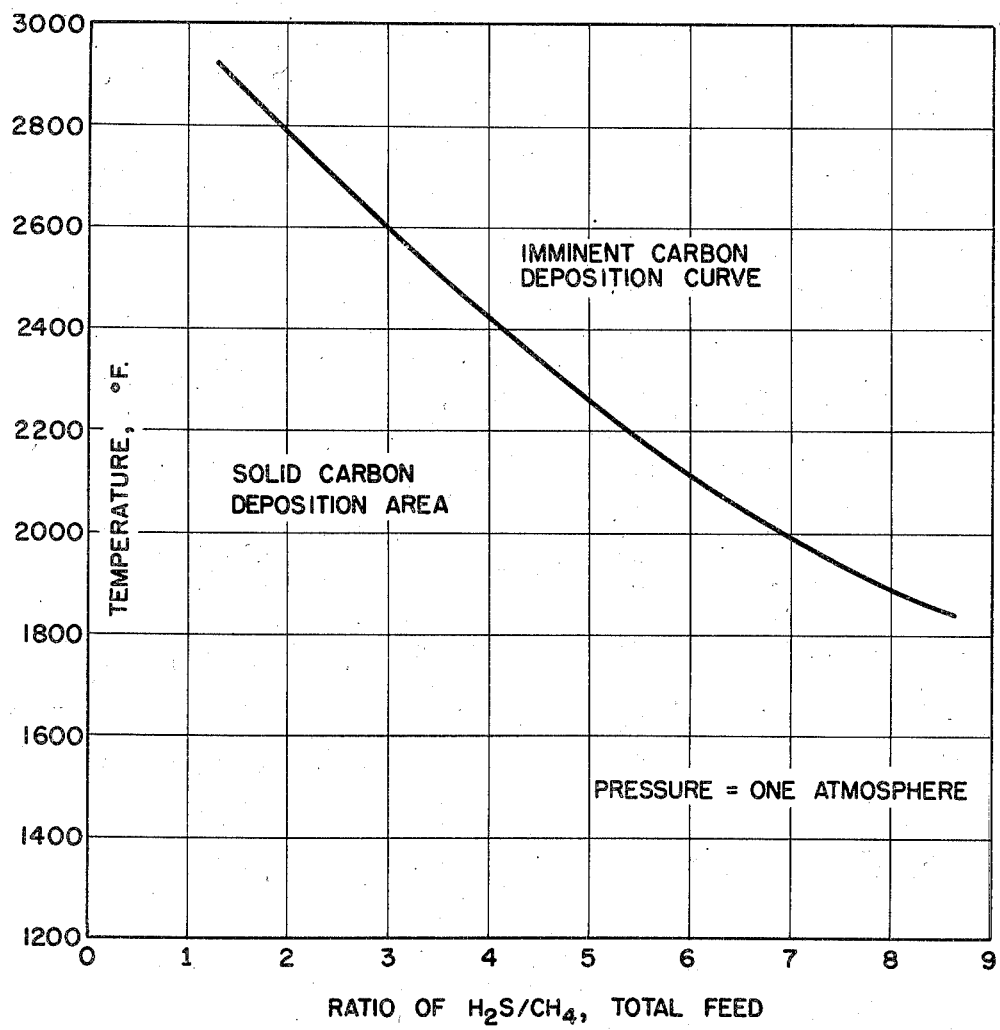

The effects of the above-mentioned conditions of temperature and hydrogen sulfide-hydrocarbon ratio are further illustrated by the curves in Figure 1. The curve in Figure 2 is illustrative of the hydrogen sulfide-methane ratio in the total feed required for operation at the carbon deposition point as a function of temperature. Thus, Figure 1 demonstrates the direct dependency of sulfur conversion to carbon disulfide on both temperature and the hydrogen sulfide-methane ratio in the total feed, indicating that higher conversions to carbon disulfide are secured at the higher temperatures and higher hydrogen sulfide-methane ratios. In Figure 2 it is shown that as the temperature decreases the system can tolerate increasing hydrogen sulfide-methane ratios without substantial variation from the point of imminent carbon deposition. Although Figure 1 indicates that highest conversions to $CS_2$ are theoretically possible at high temperatures and high hydrogen sulfide-methane ratios, the curve in Figure 2 shows that in order to maintain the system at the point of imminent carbon deposition the hydrogen sulfide-methane ratio must be decreased with increasing temperature and vice versa. Accordingly, the ranges of temperature and hydrogen sulfide-hydrocarbon ratio taught herein are those which represent the optimum values under such conditions.

The catalysts which may be employed in carrying out the process of our invention comprise a relatively large group of components including silica gel, the sulfides of zinc, calcium, cadmium, chromium, vanadium, titanium and the like. These materials may be used as such to promote the involved reaction or they may be placed on supports such as pumice, fuller's earth, various clays, etc., to constitute suitable catalysts. In this connection it is to be pointed out that while it may generally be desirable to carry out the process of our invention in the presence of a catalyst, we do not consider it absolutely necessary to do so in order to obtain carbon disulfide from hydrogen sulfide and hydrocarbons in accordance therewith.

Space velocities used in the process of our invention may be varied within relatively wide limits with comparatively little change in the conversion secured. Maximum space velocities depend principally on the desired quantity of reactants converted per pass. At a given temperature, conversions decrease with increasing space velocities. However, conversions may be held substantially constant at increasing space velocities if the temperature is simultaneously increased. Under the conditions of our process, space velocities of from about 600 to about 3000 S. C. F. H. reactants/cu. ft. of catalyst will generally be found satisfactory.

Inasmuch as pressure tends to reduce rather than increase the conversion to carbon disulfide, we prefer to carry out our process at substantially atmospheric pressure. Relatively slight increases in conversion are observed by using subatmospheric pressures, but from a standpoint of overall economy their use is not believed justified.

As examples of hydrocarbon feeds which may be used in carrying out the process of our invention, there may be mentioned the normally gaseous hydrocarbons. Of these materials, methane is generally preferred, a convenient source thereof being natural gas. Also, gaseous hydrocarbons of the type found in refinery gases may likewise be used. Moreover, refinery gases resulting from the processing of sour crudes may be employed as a source of both hydrogen sulfide and the necessary hydrocarbon. In connection with the hydrocarbon source which may be employed in carrying out the process of our invention, one of the advantageous features thereof resides in the fact that relatively large quantities of both the hydrocarbon and the hydrogen sulfide are found in nature, generally at the same site. Because of this fact a minimum of preliminary processing work is needed prior to preparing these reactants from, for example, sour natural gas in suitable proportions for effecting the process herein defined.

The following indicates results which may be obtained by operating in the absence of a catalyst and within the ranges of reactants and temperatures covered by our invention using methane as the hydrocarbon source. The figures appearing under each of the runs listed below show the concentration of corresponding components present in the tail gas from the reactor.

| Component of Reactor Tail Gas | Run 1*—2,700° F. S-H Ratio=0.25 | Run 2*—2,400° F. S-H Ratio=0.30 | Run 3*—1,850° F. S-H Ratio=0.40 |
|---|---|---|---|
| | Mol Percent | Mol Percent | Mol Percent |
| $H_2S$ | 0.5 | 14.1 | 49.0 |
| $H_2$ | 78.8 | 68.1 | 40.0 |
| $CS_2$ | 19.5 | 15.9 | 9.6 |
| $CH_4$ | 0.1 | 0.1 | 0.1 |
| $S_2$ | 1.1 | 1.8 | 1.3 |

*Atmospheric pressure.

Figure 3:
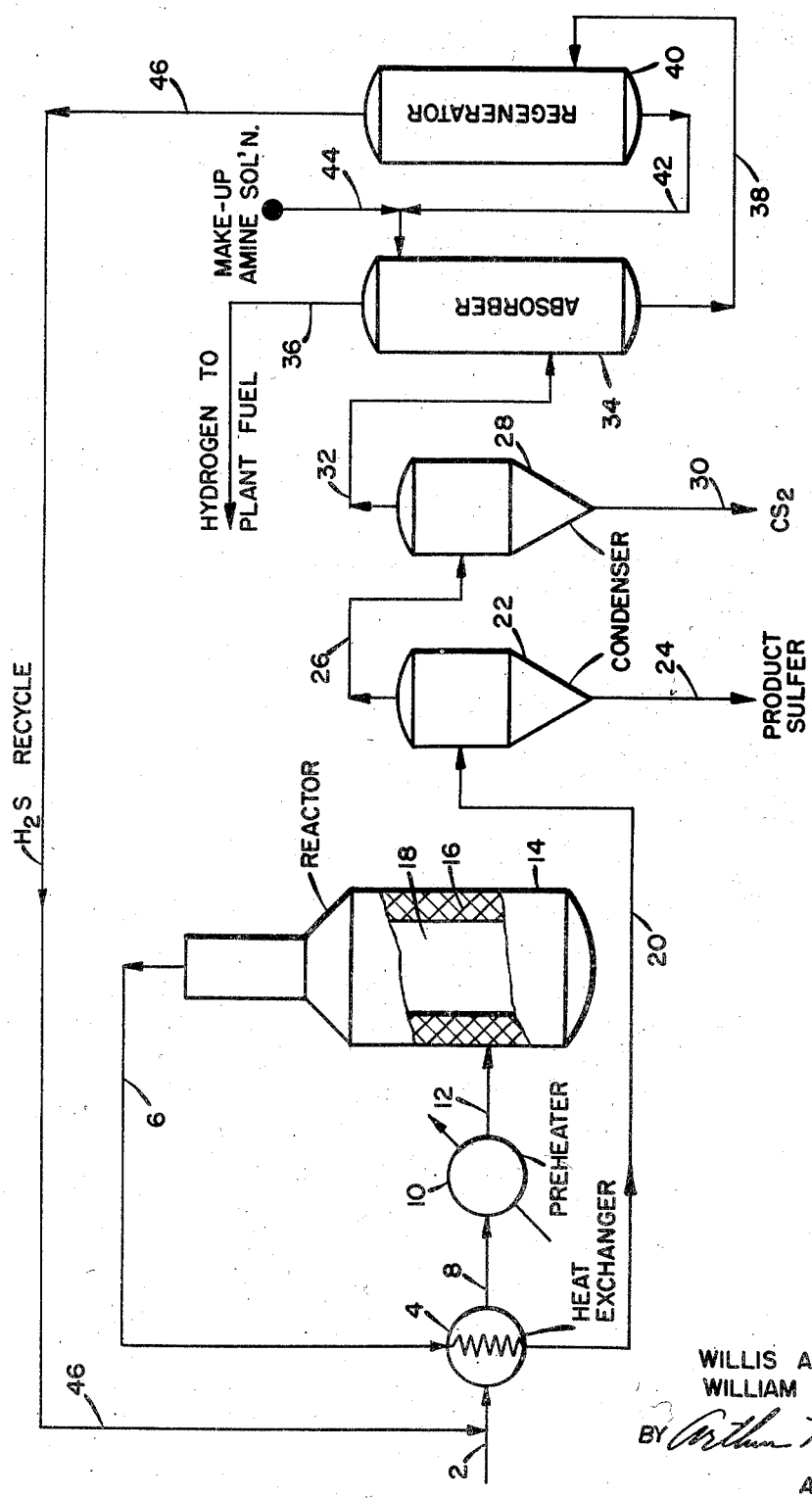

The process of our invention will be further illustrated by reference to the accompanying drawing (Figure 3) in which a cold feed mixture containing, for example, methane and hydrogen sulfide in a molar ratio of about 1:4 is introduced through line 2 into heat exchanger 4 where the temperature of the feed is increased to about 1000° F. by indirect heat exchange with hot gaseous reaction products in line 6. The feed is withdrawn through line 8 and sent to preheater 10 where it is brought to a reaction temperature of about 2400° F., and thereafter sent through line 12 to reactor 14 lined with a suitable refractory material 16. Conversion of methane and hydrogen sulfide to carbon disulfide occurs principally in reaction zone 18 which may or may not contain a bed of suitable catalyst. The resulting gaseous products of the reaction are taken overhead from the reactor through line 6 and cooled by introduction thereof into heat exchanger 4 where said products come into indirect heat exchange with the cool feed in line 2. The cooled gaseous products are next sent through line 20 to condenser 22 where they are further cooled to a temperature of about 350° F. to separate liquid sulfur from the system through line 24. The uncondensed gases are taken off through line 26 and cooled still further, i. e., to about 32° F., in condenser 28 which is operated at a pressure sufficient to condense at least 75 to 90 percent of the carbon disulfide, i. e., about 50 to 100 p. s. i. The resulting liquid carbon disulfide is withdrawn through line 30. The remaining uncondensed gases, which consist principally of hydrogen together with some unconverted hydrogen sulfide, are withdrawn from the condenser through line 32 and sent to absorber 34 equipped to separate hydrogen sulfide from the remaining gaseous effluent issuing from condenser 28. The method used to accomplish this object may be any of a number of well-established procedures. In general, we have found that a hydrogen sulfide separation system involving absorption of the hydrogen sulfide from said gaseous effluent by the use of a 15 to 25 weight percent aqueous diethanol amine solution followed by liberation of hydrogen sulfide from the resulting diethanol amine salt constitutes an adequate hydrogen sulfide separation method for the purposes of the present invention. The gas from which the hydrogen sulfide has been stripped by the action of diethanol amine thereon, and which consists essentially of product hydrogen, leaves the absorber through line 36 and a portion thereof may be used as fuel for the operation of preheater 10 and reactor 16. Ordinarily about twice as much hydrogen is recovered at this point as is called for by the heat requirements of our process. The solution of diethanol amine which is saturated with hydrogen sulfide leaves absorber 34 through line 38 and is introduced into regenerator 40, in which hydrogen sulfide is liberated. The resulting lean diethanol amine solution is withdrawn from the regenerator through line 42 and returned to absorber 34 where it is again used to separate hydrogen sulfide contained in the gases supplied by line 32. Make-up amine solution may be added to the system through line 44. The stream consisting essentially of hydrogen sulfide liberated in regenerator 40 is withdrawn through line 46 and returned to line 2, where it is mixed with the hydrogen sulfide and methane contained therein and converted to additional carbon disulfide.

From the foregoing description it will be apparent that the process of our invention is susceptible of numerous modifications without materially departing from the scope thereof. In general, it may be said that any procedure employing, in principle, the novel conditions herein set forth is intended to come within the spirit of our invention.

We claim:

1. In a process for the preparation of carbon disulfide by the reaction of hydrogen sulfide with a normally gaseous hydrocarbon, the improvement which comprises effecting said reaction at a temperature ranging from about 1850° F. at a hydrogen sulfide-hydrocarbon molar ratio of about 8:1 and at a carbon-hydrogen atomic ratio of about 0.05:1 to about 2750° F. at a hydrogen sulfide-hydrocarbon molar ratio of about 2:1 and at a carbon-hydrogen atomic ratio of about 0.125, the relationship of said molar and atomic ratios to said temperature range being such that any combination of said ratios and temperature employed within the aforesaid ranges defines a point falling substantially on the curve in Figure 2.

2. The process of claim 1 in which the reaction is effected in the presence of a catalyst.

3. In a process for the preparation of carbon disulfide by the reaction of hydrogen sulfide with methane, the improvement which comprises effecting said reaction at a temperature ranging from about 1850° F. at a hydrogen sulfide-methane molar ratio of about 8:1 to about 2750° F. at a hydrogen sulfide-methane molar ratio of about 2:1, the relationship of said molar ratio to said temperature range being such that any combination of hydrogen sulfide-methane ratio and temperature employed within the aforesaid ranges defines a point falling substantially on the curve in Figure 2.

4. The process of claim 3 in which the reaction is effected in the presence of a catalyst and at space velocities of from about 600 to about 3000 S. C. F. H. reactants/cu. ft. of catalyst.

5. In a process for the preparation of carbon disulfide by the reaction of hydrogen sulfide with methane, the improvement which comprises effecting said reaction in a reaction zone at a temperature ranging from about 1850° F. at a hydrogen sulfide-methane molar ratio of about 8:1 to about 2750° F. at a hydrogen sulfide-methane molar ratio of about 2:1, the relationship of said molar ratio to said temperature range being such that any combination of hydrogen sulfide-methane ratio and temperature employed within the aforesaid ranges defines a point falling substantially on the curve in Figure 2, withdrawing the resulting products, including unconverted hydrogen sulfide from said reaction zone, cooling said products to a temperature sufficiently low to liquefy the sulfur therein but sufficient to cause the carbon disulfide to separate as a liquid from said products thereafter separating the carbon disulfide thus produced from the aforesaid sulfur and other gaseous reaction products, separating hydrogen sulfide from the latter and recycling the hydrogen sulfide thus separated to the aforesaid reaction zone.

6. In a process for the preparation of carbon disulfide by the reaction of hydrogen sulfide with methane, the improvement which comprises effecting said reaction in the presence of a catalyst at a temperature of from about 2350° to about 2450° F. and at a hydrogen sulfide-methane molar ratio such that any combination of said ratio and temperature employed within the above stated range defines a point falling substantially on the curve in Figure 2.

References Cited in the file of this patent

UNITED STATES PATENTS

| 1,735,409 | Pier et al. | Nov. 12, 1929 |
| 2,391,541 | Belchetz | Dec. 25, 1945 |
| 2,428,727 | Thacker | Oct. 7, 1947 |

OTHER REFERENCES

Waterman et al.: "Journal of the Society of Chemical Industry," March 1939, pages 109–110.